Patented Apr. 13, 1926.

1,580,716

UNITED STATES PATENT OFFICE.

JOSEPH FLACHSLAENDER AND LAURIE L. BURGESS, OF WILMINGTON, DELAWARE, ASSIGNORS TO E. I. DU PONT DE NEMOURS & COMPANY, OF WILMINGTON, DELAWARE, A CORPORATION OF DELAWARE.

BROWN COPPER CONTAINING AROMATIC AMINE-SULPHUR DYES AND PROCESS OF MAKING THE SAME.

No Drawing.    Application filed March 19, 1924.   Serial No. 700,379.

*To all whom it may concern:*

Be it known that we, JOSEPH FLACHSLAENDER and LAURIE L. BURGESS, citizen of Germany and subject of the King of England, and residents of Wilmington, in the county of New Castle and State of Delaware, have invented a certain new and useful Brown Copper Containing Aromatic Amine-Sulphur Dyes and Processes of Making the Same, of which the following is a specification.

This invention relates to the production of sulphur dyes of from brown to khaki shades, and comprises heating together an aromatic amine and sulphur, dissolving the resulting mass in sodium hydroxide or sodium sulphide solution, incorporating a compound of copper in the resulting solution, and then evaporating the mixture to dryness. Proceeding in this manner, a full cutch shade is produced which cannot be obtained when the copper salts are omitted.

For the amine there may be used a diamine such as toluylenediamine, or a mixture thereof with a nitroamine such as para-nitraniline. As copper salts there may be used the sulphates, chlorides, etc. of copper.

The process for manufacturing these dyestuffs is illustrated by the following example:

500 pounds of sulpur are charged into an iron thionator provided with an agitator, the temperature raised to 160° C. and maintained at about that point until the sulphur is all melted. 150 pounds of m-toluylenediamine is then added quickly. The temperature is then raised in about 4 hours to 275° C. and maintained at this point for 18 to 22 hours, or until the desired shade and maximum strength have been developed. The charge is then cooled to 180° C. and 1350 pounds of a thirty per cent solution of sodium hydroxide added. The resulting mass is boiled until sulphur compound is completely dissolved, and 40 pounds of copper sulphate crystals added. The resulting mixture is then evaporated to dryness, maintaining the temperature at about 230° C. until water ceases to be evolved. Then 200 pounds of salt are added and the temperature raised to 295° C. during the course of 4 to 6 hours and held at this temperature for about 4 hours or until a test shows that the desired shade and maximum strength have been obtained. It is then cooled, discharged and ground. The dyestuff obtained by this process is easily soluble in hot dilute sodium hydroxide or sodium sulphide solutions and dyes unmordanted cotton in full cutch shades which are fast to washing, milling and acids.

Our process is not, of course, limited to the specific starting materials or conditions mentioned in the preceding example. For instance aromatic diamines of the benzenoid series, other than meta-toluyplene-diamine, may be used either alone or mixed with said meta-toluylene-diamine; or, the meta-toluylenediamine may be used in admixture with para-nitraniline. Thus when a mixture of meta-toluylenediamine and para-nitraniline is thionated, extracted with sulphide or caustic, evaporated and baked with the addition of copper sulphate, a dye of khaki shade is produced.

There may be considerable variation in times and temperatures given in the above example. For instance, the temperature in the final baking may be lowered from 295° to 280°, in which case a dye appreciably yellower in shade is produced. By the term "baking" as used herein, we mean heating at a temperature in the neighborhood of, but usually a little below, 300° C.

The copper compound referred to above may, if desired, be introduced into the reaction mass during thionation of the aromatic diamine.

We claim:

1. The process of making sulphur dyes of from brown to khaki shades which comprises incorporating a copper salt in an alkaline solution of a thionated aromatic amine, evaporating the solution to dryness, and baking the dried mass until a product of suitable shade and strength is obtained.

2. The process of making sulphur dyes of from brown to khaki shades which comprises mixing a copper salt with an aqueous alkaline solution of a thionated aromatic diamine of the benzenoid series, evaporating the solution to dryness and baking the residue until a product of suitable shade and strength is obtained.

3. The process of making sulphur dyes of from brown to khaki shades which comprises mixing a copper salt with a sodium hydroxide solution of a thionated meta-toluylenediamine, evaporating the solution to dryness and baking the residue until a product of suitable shade and strength is obtained.

4. A process as set forth in claim 1 in which the baking is carried on at a temperature of from about 280 to 295° C.

5. The process of making sulphur dyes of from brown to khaki shades which comprises heating a mixture comprising meta-toluylenediamine and sulphur until a product of the desired shade and strength is formed, dissolving the reaction mass in sodium hydroxide solution, adding a soluble copper salt to resulting solution, evaporating the mixture to dryness and baking the residue until a product of the desired shade and strength is obtained.

6. A process as set forth in claim 5 in which the thionation of the meta-toluylenediamine is effected at a temperature of about 275° C., and the baking of the residue is done at a temperature of from about 280 to 295° C.

7. A process as set forth in claim 5 in which the mixture comprising meta-toluylene-diamine and sulphur also includes para-nitraniline.

8. A process as set forth in claim 2 in which the baking is carried on at a temperature of from about 280 to 295° C.

9. A process as set forth in claim 3 in which the baking is carried on at a temperature of from about 280 to 295° C.

10. As a new product a sulphur dye obtainable by incorporating a copper salt in an alkaline solution of a thionated aromatic amine, evaporating the solution to dryness, and baking the dried mass until a product of suitable shade and strength is produced, said dye being easily soluble in hot dilute sodium hydroxide or sodium sulphide solutions, and dyeing unmordanted cotton in shades which are fast to washing, milling, and acids.

11. As a new product a sulphur dye obtainable by mixing a copper salt with an aqueous alkaline solution of a thionated aromatic diamine of the benzenoid series, evaporating the solution to dryness, and baking the residue until a product of suitable shade and strength is produced, said sulphur dye being easily soluble in hot dilute sodium hydroxide or sodium sulphide solutions, and dyeing unmordanted cotton in from brown to khaki shades which are fast to washing, milling, and acids.

12. As a new product a sulphur dye obtainable by mixing a copper salt with a sodium hydroxide solution of a thionated meta-toluylenediamine, evaporating the solution to dryness, and baking the residue until a product of suitable shade and strength is produced, said sulphur dye being easily soluble in hot dilute sodium hydroxide or sodium sulphide solutions, and dyeing unmordanted cotton in from brown to khaki shades which are fast to washing, milling, and acids.

13. As a new product the sulphur dye obtainable by the process set forth in claim 4.

14. As a new product the sulphur dye obtainable by the process set forth in claim 5.

15. As a new product the sulphur dye obtainable by the process set forth in claim 7.

In testimony whereof we affix our signatures.

JOSEPH FLACHSLAENDER.
LAURIE L. BURGESS.